United States Patent [19]

Haraschima

[11] Patent Number: 4,697,778
[45] Date of Patent: Oct. 6, 1987

[54] TELEVISION TURNTABLE FOR PROVIDING IMPROVED STABILITY

[75] Inventor: Eiichi Harashima, Hachioji, Japan

[73] Assignee: Kabushiki Kaisha Murakoshi Seiko, Tokyo, Japan

[21] Appl. No.: 886,057

[22] Filed: Jul. 16, 1986

[30] Foreign Application Priority Data

Jul. 25, 1985 [JP] Japan .......................... 60-114115[U]

[51] Int. Cl.⁴ ............................................. A47B 91/00
[52] U.S. Cl. .................................. 248/349; 108/103; 108/139; 211/163; 248/131; 248/415; 248/678
[58] Field of Search .............. 248/349, 346, 521, 522, 248/519, 523, 131, 144, 145, 415, 678; 108/103, 104, 94, 139; 211/163, 144

[56] References Cited

U.S. PATENT DOCUMENTS

| | | | |
|---|---|---|---|
| 2,687,267 | 8/1954 | Copenhaver | 248/131 X |
| 2,779,642 | 1/1957 | Matthews | 248/349 X |
| 3,479,632 | 11/1969 | Galles | 248/349 X |
| 4,117,627 | 10/1978 | Slingerland | 108/103 X |
| 4,485,997 | 12/1984 | Potter | 211/163 X |
| 4,542,872 | 9/1985 | Marino et al. | 248/349 X |
| 4,566,664 | 1/1986 | Donald | 248/349 |
| 4,579,473 | 4/1986 | Brugger | 248/349 X |
| 4,591,120 | 5/1986 | Bryant-Jeffries et al. | 248/349 X |
| 4,635,894 | 1/1987 | Sammons | 248/349 X |

Primary Examiner—Ramon O. Ramirez
Attorney, Agent, or Firm—James E. Nilles; Nicholas A. Kees

[57] ABSTRACT

A turntable wherein a base member supports rotatably a rotatable member through a shaft and a bearing. The bearing consists of a plate member positioned between the base member and the rotatable member and rollers which are rotatably held in a plurality of roller retaining bores formed in the plate member. The shaft is inserted rotatably through the plate member. The bores extend radially around the shaft.

5 Claims, 3 Drawing Figures

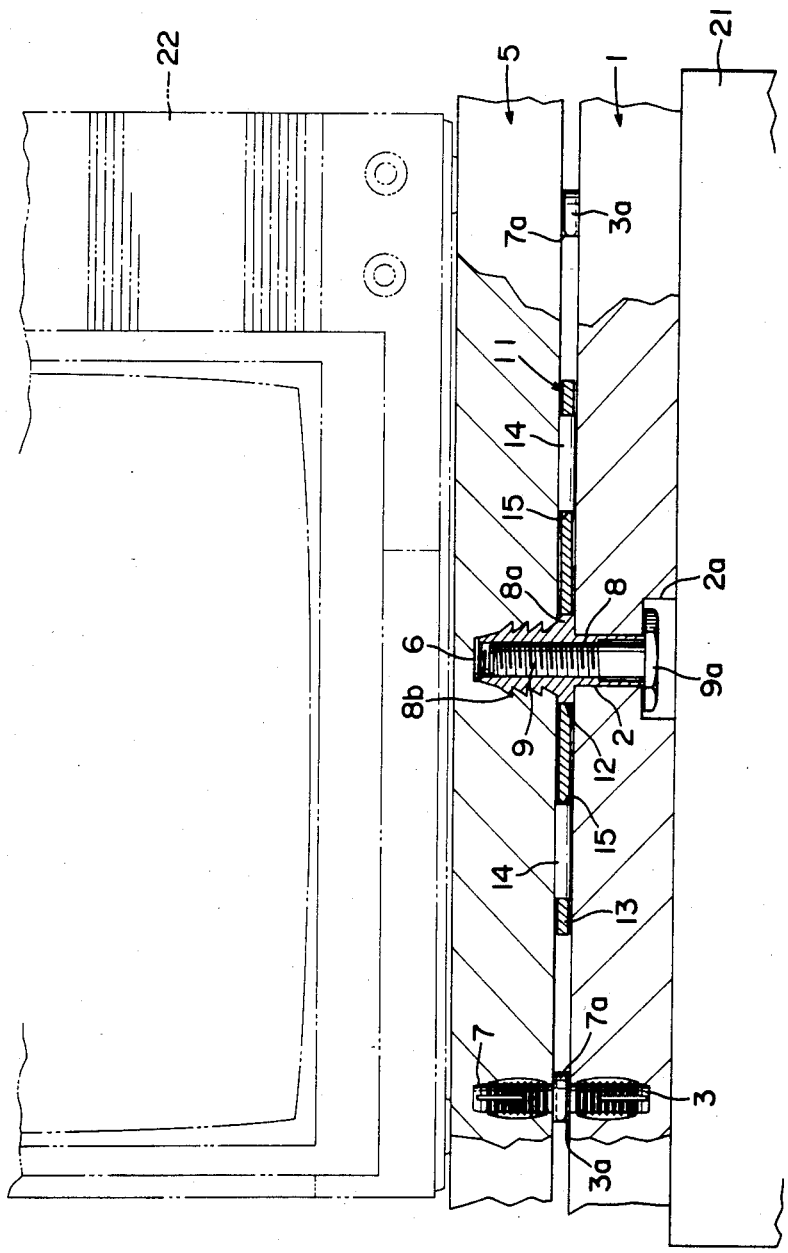

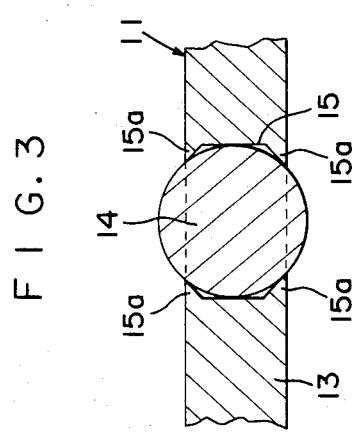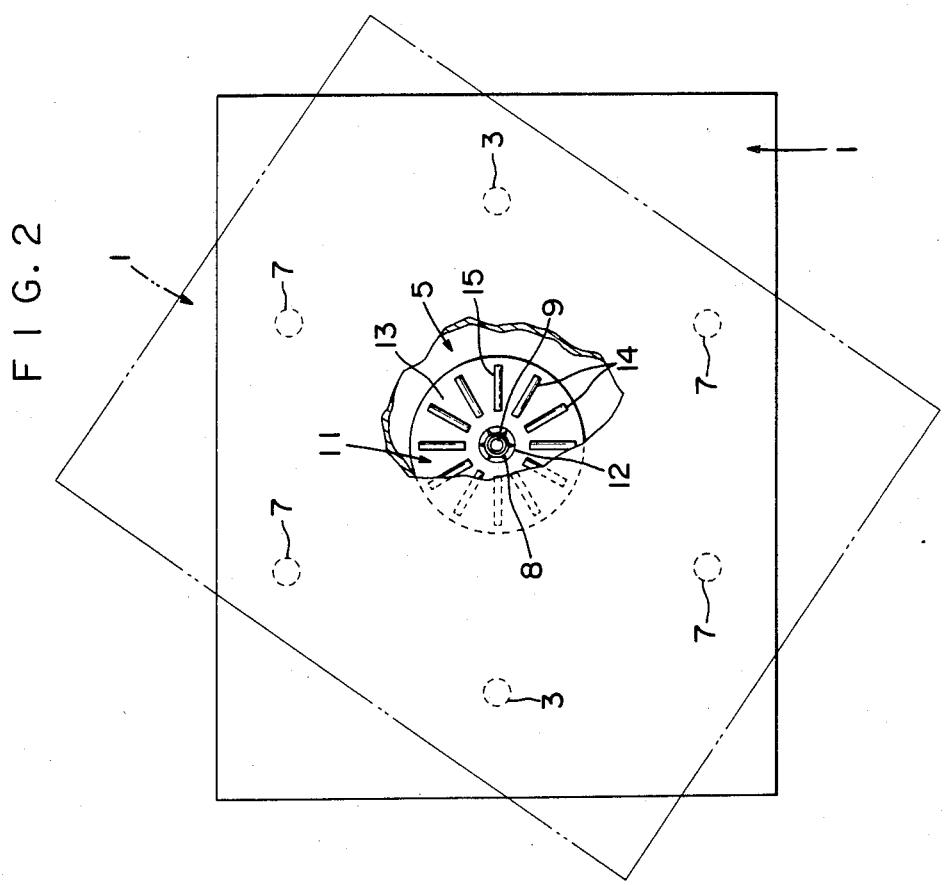

TELEVISION TURNTABLE FOR PROVIDING IMPROVED STABILITY

BACKGROUND OF THE INVENTION

1. Field of the Invention

This invention relates to a turntable used as a support for a television set.

2. Description of the Prior Art

A turntable as a support for a television set is known, which can be turned with a television set placed on the upper surface thereof, in such a manner that, for example, a picture frame on the television set can be set at such an angle that enables a picture to be easily seen. This kind of turntable consists, for example, of a lower plate as a base member, and an upper plate as a pivotable member joined rotatably via a shaft to the lower plate. In a conventional turntable of this kind, a pulley is provided between these lower and upper plates to form a driving means for the rotatable upper plate.

In this conventional driving means, a load is liable to be partially imparted to a pulley, so that the upper plate becomes unstable. Consequently, the turning movement of the upper plate is not made smoothly, and troubles readily occur.

SUMMARY OF THE INVENTION

An object of the present invention is to solve these problems, and provide a simply-constructed turntable free from the occurrence of a partial load on a base member thererof, having a stably supported, smoothly moving rotatable member and operation in good order at all times.

The present invention consists of a base member, a rotatable member positioned above the base member and supported so that the rotatable member can be turned freely via a shaft with respect to the base member, and a bearing composed of a plate member positioned between the base member and the rotatable member, said shaft being inserted rotatably through said plate member, and rollers which are rotatably held in a plurality of roller retaining bores formed in the plate member so that these bores extend radially around the mentioned shaft, and which are sandwiched between the base member and the rotatable member.

According to the present invention, when the rotatable member, which is supported on the base member via the shaft, and having a television set placed thereon, is turned with respect to the base member, the rollers, which are held in the roller retaining bores formed in the plate member so as to extend radially around the shaft, rotate about the shaft while being sandwiched between the base member and the rotatable member; and the plate member is also turned around the mentioned shaft. The rotatable member is thus turned smoothly and stably.

The above and other objects as well as the advantageous features of the invention will become apparent from the following description of the preferred embodiment taken in conjunction with the accompanying drawings.

BRIEF DESCRIPTION OF THE DRAWINGS

FIG. 1 is a partially sectioned front elevation of an embodiment of the turntable according to the present invention;

FIG. 2 is a partially cutaway view in plan of the embodiment; and

FIG. 3 is a sectional view of the portion of a bearing which is in the vicinity of a roller.

DESCRIPTION OF THE PREFERRED EMBODIMENT

Reference numeral 1 denotes a lower plate as a flat rectangular plate type base member, which is provided in the central portion thereof with a vertically extending through bore 2 having a larger-diameter portion 2a at the lower section thereof. The lower plate 1 is furtehr provided with stoppers 3 in the portions thereof which are symmetrical with each other with respect to the through bore 2 in the lengthwise direction of the lower plate 1, and each of these stoppers 3 is driven into and fixed in the lower plate 1 with its head portion 3a projecting from the upper surface thereof.

Reference numeral 5 denotes an upper plate as a rotatable plate having the same shape as the lower plate 1. The upper plate 5 is provided in the central portion thereof with a vertically extending bore 6 which is opened at its lower end. The upper plate 5 is further provided with stoppers 7 in the portions thereof which correspond to the vertexes of an imaginary rectangle drawn thereon, the center of which corresponds to the bore 6, and the shorter sides of which are parallel to the longer sides of the upper plate 5. These stoppers 7 are driven into and fixed in the upper plate 5 with their head portions 7a projecting from the lower surface of the upper plate 5. The distance between each of these stoppers 7 and the bore 6 is equal to that between each of the stoppers 3 in the lower plate 1 and the through bore 2.

Reference numeral 8 denotes a nut-like shaft formed in a substantially cylindrical shape, and provided on the axially intermediate portion of the outer surface thereof with an annular collar 8a projecting outward therefrom. The shaft 8 is further provided on the outer surface of the upper portion thereof with a plurality of triangular slip-preventing members 8b projecting outward therefrom. Reference numeral 9 denotes a bolt engaged with the inner surface of the shaft 8.

Reference numeral 11 denotes a bearing, which consists of a circular plate member 13 having in the central portion thereof a through bore 12 the diameter of which is substantially equal to that of the collar 8a, and a plurality of cylindrical rollers 14 held in the plate member 13 so that the rollers 14 can be turned. The plate member 13 is provided with a plurality of roller-retaining bores 15 extending along radial lines passing the center thereof. Each of these roller-retaining bores 15 is provided at the upper and lower edge portions of two sides sections thereof which are opposed to each other in the lengthwise direction of the bore 15 with inwardly-extending projections 15a as shown in FIG. 3. When the rollers 14, the diameter of each of which is larger than the thickness of the plate member 13, are fitted under pressure in the roller-retaining bores 15 by utilizing the elasticity of the plate member 13, the rollers 14 are held rotatably therein as they are slip-prevented by the projections 15a.

In order to assemble this turntable, the upper portion of the nut-like shaft 8 is fitted in the bore 6 in the upper plate 5 and fixed therein first. The through bore 12 in the bearing 11 is then engaged with the collar 8a on the portion of the shaft 8 which projects from the bore 6. The lower portion of the shaft 8 is inserted into the through bore 2 in the lower plate 1, and the bolt 9 is engaged with the inner surface of the shaft 8 from the lower side thereof. After the completion of these operations, the head portion 9a of the bolt 9 is positioned in the larger-diameter portion 2a of the through bore 2, and the lower end of the shaft 8 projects slightly into the larger-diameter portion 2a, the head portion 9a of the bolt 9 contacting the lower end of the shaft 8.

In the turntable in this condition, the shaft 8 is rotatable with respect to the lower plate 1 and bearing 11. Since the rollers 14 in the bearing 11 are sandwiched between the upper surface of the lower plate 1 and the lower surface of the upper plate 5, the upper plate 5 is supported on the lower plate 1. The stoppers 3 in the lower plate 1 and those 7 in the upper plate 5 are positioned on the same circle.

In order to put this turntable to practical use, the lower plate 1 is placed on a base 21, and a television set 22 on the upper plate 5, as shown in FIG. 1. The upper plate 5 is then turned around the shaft 8 with respect to the lower plate 1 to regulate the angle of the picture frame on the television set 22 to such a level that enables the picture on the frame to be seen easily. The turning of the upper plate 5 is restricted to a predetermined range of angles since the stoppers 7 provided therein engage those 3 provided in the lower plate 1. The chain lines in FIG. 2 show the upper plate 5 turned at a certain angle.

During such a turning movement of the upper plate 5, the rollers 14 in the bearing 11 are turned within the roller-retaining bores 15 as the rollers 14 are sandwiched between the lower and upper plates 1, 5, and the plate member 13 of the bearing 11 is turned around the shaft 8. The upper plate 5 is thus turned smoothly. Since the upper plate 5 is supported on a plurality of rollers 14, which are arranged radially around the shaft 8 and in parallel with the lower and upper plates 1, 5, a partial load does not occur on the upper plate 5, so that the upper plate 5 can be stably supported. Moreover, since the bearing 11 is constructed simply as mentioned above, a trouble rarely occurs therein, and a stable operation thereof can be maintained.

Owing to the combination of such a construction of the bearing 11 and the portion of the upper plate 5 which is supported via a shaft on the lower plate 1, and which consists of the nut-like shaft 8 of a simple construction as mentioned above, the assembling of the turntable as a whole can be done easily.

According to the present invention, a bearing is provided, which consists of a shaft-inserted plate member positioned between a base member and a rotatable member supported via a shaft on the base member, and rollers which are held in a plurality of roller-retaining bores provided in the plate member so as to extend radially around the mentioned shaft, and which are sandwiched between the base member and pivotable member. Therefore, the rotatable member is supported on the rollers stably with no partial load occurring thereon. Since the plate member and rollers are turned in accordance with the turning movement of the rotatable member, the rotatable member moves smoothly. Sine the bearing has a simple construction as mentioned above, troubles rarely occur, and a stable turning movement of the turntable can be maintained.

I claim:
1. A turntable comprising:
   a base member,
   a rotatable member supported above said base member by a shaft positioned at the center of said base member and said rotatable member so that said rotatable member is rotatable freely via said shaft with respect to said base member, and
   a bearing means arranged between said base member and said rotatable member, said bearing means including:
   a plate member positioned between said base member and said rotatable member, said shaft being inserted rotatably through said plate member at the center thereof,
   a plurality of elongated roller retaining bores formed in said plate member so that said bores extend radially around said shaft, and
   elongated cylindrical rollers rotatably held in said roller retaining bores and sandwiched between said base member and said rotatable member, and
   each of said roller retaining bores being provided with inwardly extending projections at the upper and lower edge portions of two opposing side sections of said bores for retaining each respective roller within the respective bore.

2. A turntable according to claim 1, wherein said shaft is secured non-rotatably at its upper portion to said rotatable member, and inserted at its lower portion rotatably through said base member with a bolt engaged with the lower portion of said shaft from the lower side thereof.

3. A turntable as recited in claim 1 further comprising limit means for limiting the rotation of said rotatable member with respect to said base member to a predetermined range of angles.

4. A turntable as recited in claim 3 wherein said limit means includes at least one upper stopper attached to the lower surface of said rotatable member at a predetermined distance from the center of the rotatable member and at least one lower stopper attached to the upper surface of the base member at the same distance from the center of the base member, such that said at least one upper stopper is in the same circle as said at least one lower stopper.

5. A turntable as recited in claim 3 wherein said limit means includes:
   at least four upper stoppers attached to the lower surface of said rotatable member positioned to correspond to the vertices of a rectangle, the center of which coincides with the center of the rotatable member, and
   at least two lower stoppers attached to the upper surface of the base member positioned symmetrical with each other about the center of said base member and spaced from the center the same distance as said four upper stoppers are spaced from the center of the rotatable member, such that said upper stoppers are in the same circle as said lower stoppers.

* * * * *